(12) United States Patent
Tribble

(10) Patent No.: US 10,687,517 B2
(45) Date of Patent: Jun. 23, 2020

(54) PORTABLE BIRD FEEDER

(71) Applicant: Chad Tribble, Englewood, CO (US)

(72) Inventor: Chad Tribble, Englewood, CO (US)

( * ) Notice: Subject to any disclaimer, the term of this patent is extended or adjusted under 35 U.S.C. 154(b) by 301 days.

(21) Appl. No.: 15/909,464

(22) Filed: Mar. 1, 2018

(65) Prior Publication Data

US 2018/0295814 A1 Oct. 18, 2018

Related U.S. Application Data

(60) Provisional application No. 62/484,734, filed on Apr. 12, 2017.

(51) Int. Cl.
  *A01K 39/00* (2006.01)
  *A01K 39/01* (2006.01)
  *A01K 39/02* (2006.01)

(52) U.S. Cl.
  CPC .......... *A01K 39/0106* (2013.01); *A01K 39/02* (2013.01)

(58) Field of Classification Search
  CPC .............. A01K 39/0206; A01K 39/016; A01K 39/012; A01K 39/026; A01K 39/04
  USPC ....... 119/72, 482, 51.01, 531, 537, 714, 715
  See application file for complete search history.

(56) References Cited

U.S. PATENT DOCUMENTS

| | | | | |
|---|---|---|---|---|
| 3,292,589 A * | 12/1966 | Williams | ........... | A01K 39/0206 119/77 |
| D252,288 S * | 7/1979 | Kilham | ........... | D30/125 |
| 4,691,665 A * | 9/1987 | Hefner | ........... | A01K 39/012 119/57.8 |
| 5,996,127 A * | 12/1999 | Leslie | ........... | A01K 39/012 119/715 |
| 6,450,126 B1 | 9/2002 | Schellenbach | | |
| 6,564,394 B2 | 5/2003 | Falwell | | |
| 8,539,910 B1 * | 9/2013 | Hensley | ........... | A01K 39/0206 119/72 |
| 2006/0201431 A1 | 9/2006 | Peterson | | |
| 2007/0221133 A1 * | 9/2007 | Richmond | ........... | A01K 39/012 119/72 |
| 2009/0031962 A1 * | 2/2009 | Webber | ........... | A01K 39/0113 119/57.9 |
| 2009/0308321 A1 | 12/2009 | Szczygiel-Durante | | |
| 2011/0308471 A1 * | 12/2011 | Puckett | ........... | A01K 39/014 119/57.8 |

OTHER PUBLICATIONS

":--2<: Wearable Hummingbird Feeder," Heatstick, No Date Available, retrieved from http://heatstick.com/_eYe2eye.htm, 6 pages.

* cited by examiner

*Primary Examiner* — Yvonne R Abbott-Lewis
(74) *Attorney, Agent, or Firm* — Sheridan Ross PC

(57) ABSTRACT

A bird feeding device is provided. The device comprises the ability to house food for attracting and feeding birds and other animals. The device is further capable of being provided in various modes of operation including a stationary mode of operation and a portable mode of operation. The portable mode comprises a support or attachment member for connecting the feeding device to a user, and wherein the bird feeding device is conveyed along with a user and operable to attract birds to the user even when the user is mobile.

20 Claims, 5 Drawing Sheets ns and without allowing animal access to any contents provided
PORTABLE BIRD FEEDER This U.S. Non-Provisional Patent Application claims the benefit of priority from U.S. Provisional Patent Application Ser. No. 62/484,734, filed Apr. 12, 2017, the entire disclosure of which is hereby incorporated by reference in its entirety.

FIELD

The present disclosure relates generally to systems, devices and methods for feeding and enabling viewing of birds and animals. Specifically, embodiments of the present disclosure related to bird feeders, and in particular to hummingbird feeders that are selectively attachable to a user.

BACKGROUND

Stationary bird feeders are known to attract birds and other animals and are often used by those who find the presence of such creatures appealing. Such devices are known to rest or hang from a surface and are typically employed in a backyard or patio setting.

Recently, portable feeder concepts have been developed. For example, U.S. Pat. No. 5,996,127 to Leslie, which is hereby incorporated by reference in its entirety, describes a wearable device for feeding birds which comprises a helmet and a plurality of offset hanging bird feeding structures. Leslie's device comprises a highly cumbersome device that is portable in only certain limited ways. U.S. Pat. No. 8,539,910 to Hensley, which is hereby incorporated by reference in its entirety, provides a user-mounted device. The device of Hensley, however, fails to provide various features and aspects of the present disclosure as shown and described herein.

SUMMARY

There has been a long-felt and unmet need to provide a bird feeding and/or attracting device that comprises a lightweight and highly portable device. There has further been a need to provide a device that may be selectively employed as a stationary device and easily transitioned to a portable device. It is an object of the present disclosure to provide a device that achieves these objectives as well as other objectives and solutions as shown and described herein.

It is an object of the present disclosure to provide and allow for the observation of birds, including hummingbirds, from a close range. In various embodiments, a device is provided that comprises a food storage container or feeding assembly and a supporting member for supporting and transporting the food container. In some embodiments, the supporting member comprises a telescoping rod with a first end that attaches to a user.

In various embodiments, devices of the present disclosure provide for the selective positioning of a feeding device with respect to a user. The selective position includes positioning the feeding device at various points in three-dimensional space relative to user. Selective positioning is contemplated as being achieved by the provision of one or more of a telescoping support member, a rotatable joint member provided at a connection between the feeding device and the support member, and an attachment member provided at one end of the support member such that the support member may be selectively secured at a plurality of locations on a user or on an accessory worn by the user.

In various embodiments, a feeding device is provided with a feeding nozzle to allow hummingbirds to access fluid contained in the feeding device. The feeding nozzle comprises a funnel-shaped nozzle located at a top end of the feeding tube assembly. The feeding nozzle further comprises an internal orifice accessible by a beak or tongue of a hummingbird. In preferred embodiments, however, a feeding device is provided that is devoid of a feeding nozzle. In such preferred embodiments, at least one aperture is provided through a sidewall of the feeding device, and an animal (e.g.) is allowed to access device contents (e.g. sugar water) through the aperture in the sidewall. The absence of a funnel provides for a compact, lightweight, and easy to manufacture device while still allowing adequate feeding opportunities for animals.

In various embodiments, the present disclosure provides a feeding device that is operable to be used as a stand-alone device as well as a portable device. Feeding devices of the present disclosure allow a user to selectively remove the feeding device from the support device for various purposes including cleaning, filling, etc. Additionally, feeding devices of the present disclosure are operable to serve as bird feeders in the absence of the support device. For example, feeding devices of the present disclosure may be set down or provided as an attractant for hummingbirds. After a period of time wherein the bird(s) have developed a learned behavior toward the device, a user may thereafter attach the feeder to a support member and be provided as a portable device.

In various embodiments, a feeding or attracting device is provided that comprises a substantially sealed or sealable feeding element and wherein the feeding element is selectively attachable to a support member. The feeding element and the support member are both portable, wherein the support member is selectively attachable to a user including, for example, a user's hat, clothing, or an accessory (e.g. backpack). In one embodiment, a feeding device is provided that comprises a substantially-enclosed member having a base, a main body portion, and a cap. At least one aperture is provided in the main body portion to allow for an animal to access and remove contents of the feeding device. In some embodiments, the at least one aperture is provided with a bung or stopper to selectively seal the at least one aperture. When the bung is secured in the at least one aperture and the cap or lid is provided on the main body portion, the feeder device comprises an enclosed or sealed device that is operable to be transported without spilling contents and without allowing animal access to any contents provided within the device. In some embodiments, the cap comprises a threaded cap member that is selectively securable to the main body portion. In alternative embodiments, the cap or lid is contemplated as comprising a press-on cap, a cork-like cap, and similar devices. It is also contemplated that a strap or tether may be provided to connect the cap to the main body portion even when the cap is not applied or secured to the main body portion.

In preferred embodiments, feeder devices of the present disclosure comprise substantially sealed or enclosed devices even when a bung or stopper (if provided) is not inserted into the aperture(s). In a preferred embodiment, a feeder device is provided comprising a main body portion with an internal volume for housing contents and two apertures. The two apertures are provided as extending laterally through a sidewall of the main body portion, and are disposed on opposite sides of the main body portion. The apertures are contemplated as comprising small apertures able to accommodate the tongue of a hummingbird (for example). In some embodiments, the apertures comprise a diameter as small as approximately 3.0-4.0 mm.

In one embodiment, a bird feeder is provided that comprises a feeding assembly comprising a body portion, a base member, a cover member, and an interior reservoir. The feeding assembly is operable to be provided as a stationary device resting on the base member and is further operable to be provided as a portable device. The interior reservoir is operable to receive at least one of a liquid and a solid food for birds. The cover member securely attaches to and at least partially secures the interior reservoir. The cover member comprises a support member. A mounting assembly is provided that comprises a first end, a second end and a length extending therebetween. The first end of the mounting assembly comprises a first attachment member for connecting to the support member of the cover member. The second end of the mounting assembly comprises a second attachment member for selectively securing the mounting assembly to an object or person. The length of the mounting assembly comprising a telescoping length that is selectively adjustable by a user.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosure.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Figure 1:
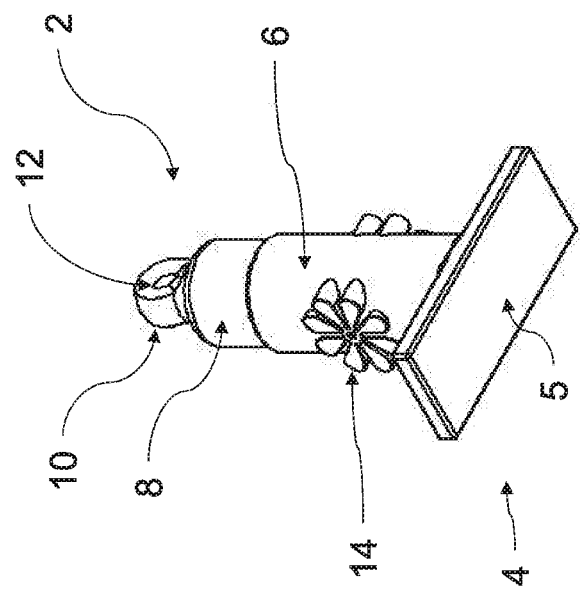
FIG. 1 is a top perspective view of a feeder device according to one embodiment of the present disclosure.
Figure 2:
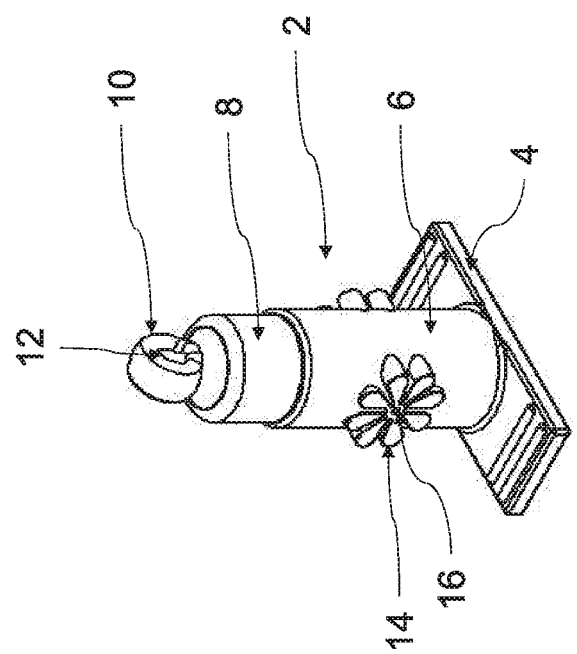
FIG. 2 is a bottom perspective view of a feeder device according to the embodiment of FIG. 1.

FIGS. 1-2 are perspective views of a feeder device 2 according to one embodiment of the present disclosure. As shown, the device or feeding assembly 2 comprises a base member 4. The base member 4 comprises a rectilinear member with a planar lower surface 5. The base member 4 comprises a support, wherein the device 2 is operable to rest on and be positioned on a surface (e.g. table or ground surface). Although the embodiment of FIG. 1 depicts the a as a substantially rectilinear member, it will be recognized that present disclosure is not limited to a base member that comprises the depicted geometric size or shape. Indeed, various alternative base members are contemplated including, but not limited to, round, ovoid, curvilinear, and irregularly shaped base members. For example, in one embodiment, it is contemplated that the base member is provided in the shape of a flower or similar item that is known to be appealing to a bird or animal.

The base member 4 provides a support for the main body portion 6 of the device 2. The main body portion 6 comprises a storage volume for housing fluid or feed. In the depicted embodiment, the main body potion 6 comprises a cylindrical extension of the base member 4, and the main body portion 6 comprises an interior volume or interior reservoir that is operable to house fluid and/or bird feed.

The main body portion 6 is secured with a cap or cover member 8, wherein the cap 8 comprises a selectively removable feature. In certain embodiments, the cap 8 comprises a threaded cap member that selectively seals the internal volume of the main body portion 6 and enables emptying and refilling of contents of the main body portion 6. The cap 8 further comprises a support member 10, which is provided as a support member in the form of a loop or eyelet 12 in the embodiment of FIGS. 1-2. The eyelet 12 is provided as a support surface as shown and described herein.

The main body portion 6 comprises an ornamental feature 14, which may take various forms and is shown as a flower in FIGS. 1-2. The ornamental feature 14 is contemplated as comprising various colors. In preferred embodiments, the ornamental feature 14 comprises a red color to attract hummingbirds. The device further comprises an aperture 16 to allow for a bird or animal to access device contents. The aperture 16 of the embodiment of FIGS. 1-2 is provided at the center of each of the ornamental features 14 provided on the main body portion 6. However, the aperture 16 may alternatively be provided in any number of different locations. Certain embodiments of the present disclosure are contemplated as comprising a funnel or similar access for hummingbirds. However, Applicant has discovered that such features are not necessarily required for hummingbirds to access contents of devices of the present disclosure. Therefore, in preferred embodiments, the device 2 is devoid of funnels or similar access features. Such embodiments reduce the weight of the device and increase the ease of manufacturing.

Figure 4:
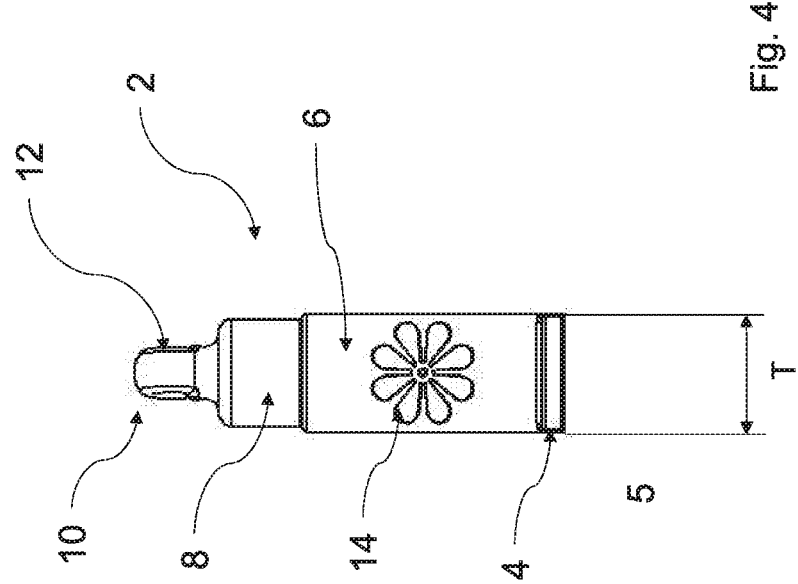
FIG. 4 is a side elevation view of the feeder device according to the embodiment of FIG. 1.
Figure 3:
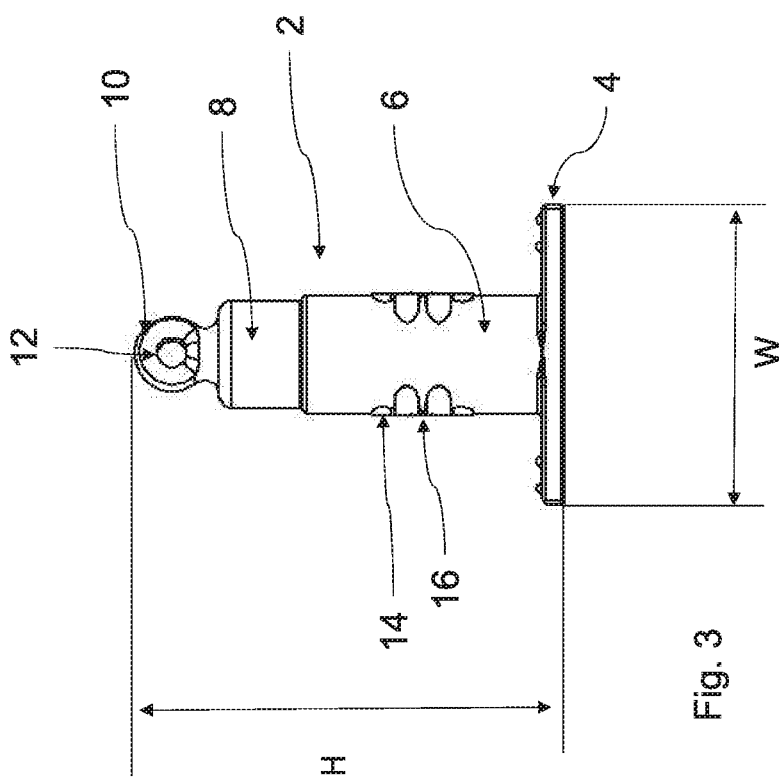
FIG. 3 is a front elevation view of the feeder device according to the embodiment of FIG. 1.

FIG. 3-4 are front and side elevation views of the device 2 according to the embodiment of FIG. 1, respectively. The features shown and described in FIGS. 1-2 are reproduced in FIGS. 3-4. As shown in FIG. 4, for example, feeding devices 2 of the present disclosure comprise relatively small and compact devices that are well suitable for travel including, for example, backpacking, rock-climbing, hiking, camping, picnicking, and similar activities. In various embodiments, the device 2 comprises a height H of between approximately 1.0 inch and approximately 6.0 inches; a width W of between approximately 1.0 inches and approximately 6.0 inches; and a thickness T of between approximately 0.5 inches and 3.0 inches. In a preferred embodiment, a height of the main body portion 6 comprises a height of approximately 3.0 inches and a width of approximately 1.0 inches; the base member 4 comprises a width of approximately 1.0 inches and a length of approximately 2.50 inches; and the cap comprises a height of approximately 1.375 inches and a width of approximately 1.0 inches.

In some embodiments, a mixing vessel is provided with the feeding device. The mixing vessel comprises a device of approximately 2.0 inches in height and 1.0 inches in width, and comprises an internal volume for mixing or preparing fluid. The mixing vessel comprises an internal volume of between approximately 2.0 and 10.0 fluid ounces, and is operable to receive a mixture or food for storage or preparation. For example, water, sugar, and/or food coloring may be provided in the mixing vessel for shaking and mixing, and the mixing vessel is further operable to be used as a storage container (for example, when the feeder is not in use). The mixing vessel comprises a screw cap or similar device for sealing an end of the vessel and securing contents.

Figure 5:
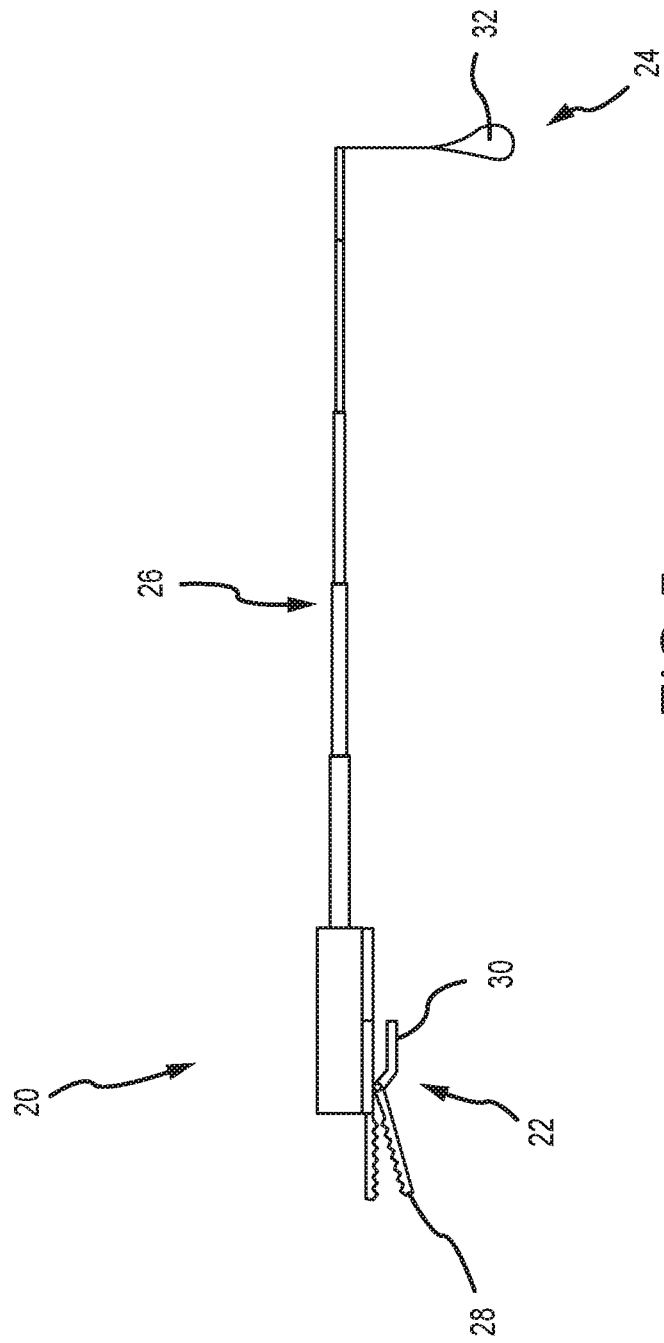
FIG. 5 is an elevation view of an attachment member for use with a feeder device according to one embodiment of the present disclosure.

FIG. 5 is a view of a mounting assembly or attachment member 20 according to one embodiment of the present disclosure. The attachment member 20 is operable to connect to, secure and support a feeder device including, but not limited to, the feeder device shown in FIGS. 1-4. The attachment member 20 comprises a first end 22, a second end 24, and a telescoping portion 26.

The first end 22 comprises an attaching portion that is operable to be secured to a user. In the depicted embodiment, the first end 22 of the attachment member 20 comprises a spring-clip comprising a toothed portion 28 and a user-interface portion 30. The clip is biased toward a closed position, wherein a user may open the clip by depressing the user-interface 30 and expanding the toothed portion 28. A telescoping portion 26 extends between the first end 22 and the second end 24. The telescoping portion comprises at least two members that are slidable and telescoping relative to each other and which enable an overall length of the attachment member 20 to be selectively retracted and expanded. Accordingly, the length of the device and a distance at which a feeder is mounted relative to a user is selectively adjustable. This is particularly desirable based on the activity a user is engaged in, the location or part to which the first is attached, and/or based on a user's preference with respect to how close animals and birds are intended to feed relative to the user.

The second end 24 of the attachment member 20 comprises a securing member 32 that is operable to attach to, secure, and support a feeder device. The securing member 32 is contemplated as comprising any one or more of the following: a loop, a clip, a magnet, a hook, a clevis, a carabiner, a strap, a hook-and-loop closure, and a simple string.

The securing member 32 comprises a mounting feature that is operable to receive the eyelet 12 of a support member 10 that is provided on a feeder device 2. Accordingly, in at least some embodiments of the present disclosure, a feeder device is provided that is operable to be provided as a stand-alone device and that is further operable to be mounted to and support by an attachment member 20. The feeder devices of the present disclosure are selectively provided as a stationary object and as a portable object.

Figure 6:
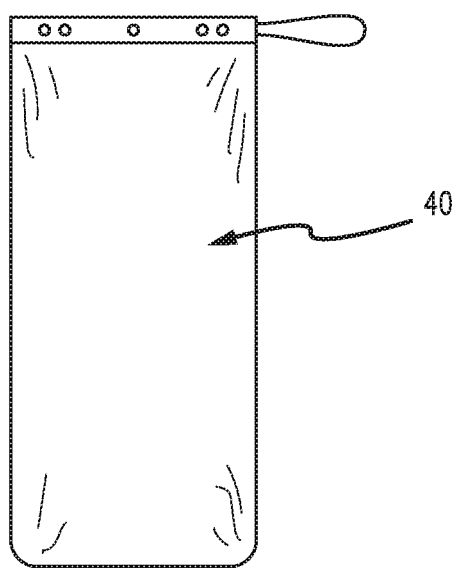
FIG. 6 is a front view of a storage and transportation device for use with embodiment of the present disclosure.

FIG. 6 is a view of a bag or carrier 40 that is operable to house and transport various feeding devices, including those shown and described herein. The carrier comprises a pouch-like structure with a draw-string or similar closure mechanism. The carrier 40 may comprise water-proof or water-resistant features and sized to simultaneously house a feeder device and a support member.

Figure 7:
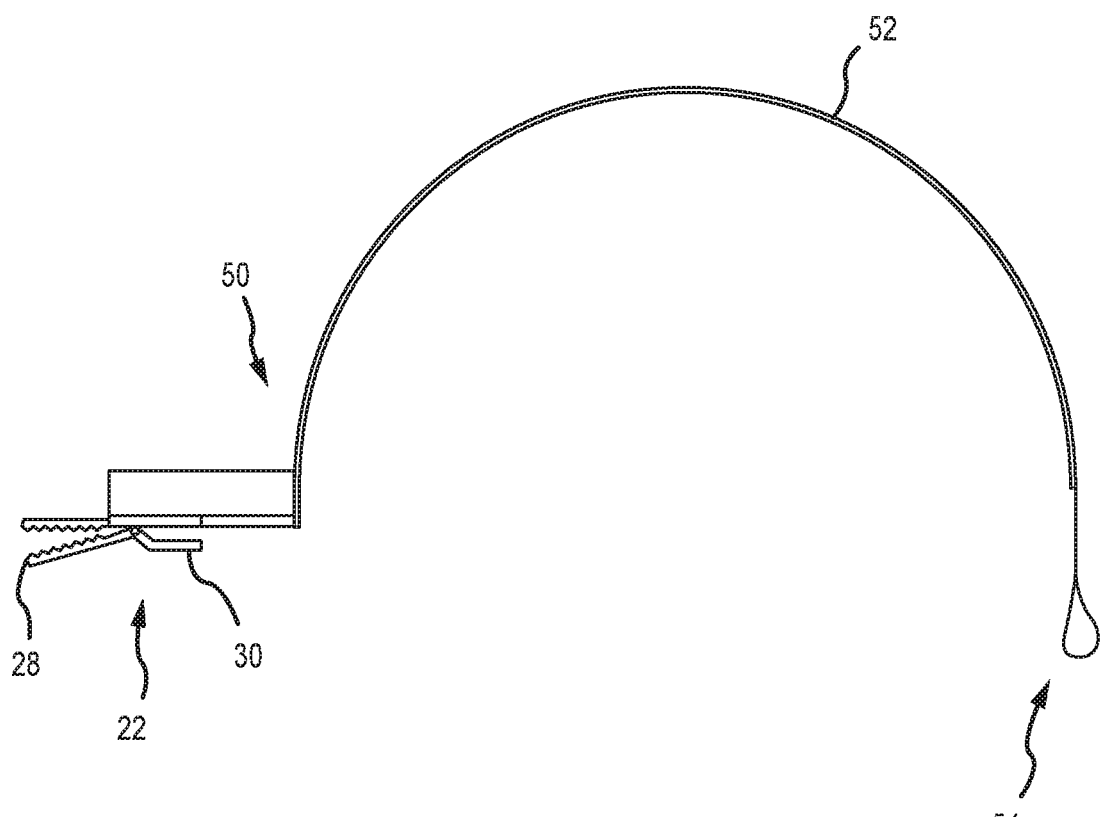
FIG. 7 is an elevation view of an attachment member for use with a feeder device according to one embodiment of the present disclosure.

FIG. 7 is a view of a mounting assembly or attachment member 50 according to one embodiment of the present disclosure. The attachment member 50 is operable to connect to, secure and support a feeder device including, but not limited to, the feeder device shown in FIGS. 1-4. The attachment member 50 comprises a first end 22, a second end 54, and an extension portion 52.

The first end 22 comprises an attaching portion that is operable to be secured to a user. In the depicted embodiment, the first end 22 of the attachment member 20 comprises a spring-clip comprising a toothed portion 28 and a user-interface portion 30. The clip is biased toward a closed position, wherein a user may open the clip by depressing the user-interface 30 and expanding the toothed portion 28. An extension portion 52 extends between the first end 22 and the second end 54. The extension portion comprises at least one member that extensions upwardly and outwardly to position the second end 54 and any associated feeder device at a distance away from a user without the extension portion 52 obstructing the view of a user. In some embodiments, the extension portion 52 comprises a resilient or flexible metal or plastic member.

The second end 54 of the attachment member 50 comprises a securing member 54 that is operable to attach to, secure, and support a feeder device. The securing member 54 is contemplated as comprising any one or more of the following: a loop, a clip, a magnet, a hook, a clevis, a carabiner, a strap, a hook-and-loop closure, and a simple string.

The securing member 54 comprises a mounting feature that is operable to receive the eyelet 12 of a support member 10 that is provided on a feeder device 2. Accordingly, in at least some embodiments of the present disclosure, a feeder device is provided that is operable to be provided as a stand-alone device and that is further operable to be mounted to and support by an attachment member 50. The feeder devices of the present disclosure are selectively provided as a stationary object and as a portable object.

In one embodiment of the present disclosure, a method of using a feeder device is provided that comprises the steps of: providing a bird feeding device with a food source; at least partially sealing the bird feeding device; positioning the bird feeding device in a stationary position and allowing birds to locate and associate the feeding device with a food source; removing the feeding device from the stationary position and attaching the feeding device to a support member; attaching the support member to a user; and transporting the feeding device by moving the feeding device and the user away from the stationary position; and allowing birds to follow the food source.

Various features of the present disclosure are shown and described with respect to one or more particular embodiments. It should be recognized, however, that devices and features shown and described herein are not limited to particular embodiment. Rather, features of the present disclosure may be interchanged and/or provided with any of the embodiments disclosed herein, even if not expressly contemplated or shown in a particular Figure.

Various features and embodiments of pressure washing devices are provided herein. It will be recognized, however, that various features are not necessarily specific to certain embodiments and may be provided on any one or more embodiments. The present disclosure and embodiments provided herein are not mutually exclusive and may be combined, substituted, and omitted. The scope of the invention(s) provided herein is thus not limited to any particular embodiment, drawing, or particular arrangement of features.

While various embodiments of the present disclosure have been described in detail, it is apparent that modifications and alterations of those embodiments will occur to those skilled in the art. However, it is to be expressly understood that such modifications and alterations are within the scope and spirit of the present disclosure. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A bird feeder, comprising:
a feeding assembly comprising a body portion, a base member, a cover member, and an interior reservoir;
wherein the feeding assembly is operable to be provided as a stationary device resting on the base member and is further operable to be provided as a portable device;
wherein the interior reservoir is operable to receive at least one of a liquid and a solid food for birds;
wherein the cover member securely attaches to and at least partially secures the interior reservoir;
wherein the cover member comprises a support member;
a mounting assembly comprising a first end, a second end and a length extending therebetween;
the first end of the mounting assembly comprising a first attachment member for connecting to the support member of the cover member;
the second end of the mounting assembly comprising a second attachment member for selectively securing the mounting assembly to an object or person;
the length of the mounting assembly comprising a telescoping length that is selectively adjustable by a user.

2. The bird feeder of claim 1, further comprising an aperture extending through a sidewall of the body portion to allow access to contents within the internal reservoir.

3. The bird feeder of claim 2, further comprise a bung or stopper to selectively seal the aperture.

4. The bird feeder of claim 1, wherein the base member comprises a rectangular base member.

5. The bird feeder of claim 1, wherein the second attachment member for selectively securing the mounting assembly to an object or person comprises a spring clip.

6. The bird feeder of claim 1, wherein the cover member comprises a threaded cap.

7. The bird feeder of claim 1, wherein the interior reservoir comprises an internal volume of between approximately 2.0 and 10.0 fluid ounces.

8. A bird feeder, comprising:
a feeding assembly comprising a body portion, a base member, a cover member, and an interior reservoir;
wherein the feeding assembly is operable to be provided as a stationary device and is further operable to be provided as a portable device;
wherein the interior reservoir is operable to receive at least one of a liquid and a solid food for birds;
wherein the cover member securely attaches to and at least partially secures the interior reservoir;
wherein the cover member comprises a support member;
a mounting assembly comprising a first end, a second end and a length extending therebetween;
the first end of the mounting assembly comprising a first attachment member for connecting to the support member of the cover member;
the second end of the mounting assembly comprising a second attachment member for selectively securing the mounting assembly to an object or person; and
an aperture extending through the body portion to allow access to contents within the internal reservoir.

9. The bird feeder of claim 8, further comprise a bung or stopper to selectively seal the aperture.

10. The bird feeder of claim 8, wherein the base member comprises a rectangular base member.

11. The bird feeder of claim 8, wherein the second attachment member for selectively securing the mounting assembly to an object or person comprises a spring clip.

12. The bird feeder of claim 8, wherein the cover member comprises a threaded cap.

13. The bird feeder of claim 8, wherein the interior reservoir comprises an internal volume of between approximately 2.0 and 10.0 fluid ounces.

14. A bird feeder, comprising:
a feeding assembly comprising a body portion, a cover member, and an interior reservoir;
wherein the feeding assembly is operable to be provided as a portable device;
wherein the interior reservoir is operable to receive at least one of a liquid and a solid food for birds;
wherein the cover member comprises a cap that securely attaches to and at least partially secures the interior reservoir;
a mounting assembly comprising a first end, a second end and a length extending therebetween;
the first end of the mounting assembly comprising a first attachment member for connecting to the cover member;
the second end of the mounting assembly comprising a second attachment member for selectively securing the mounting assembly to an object or person; and
an aperture extending through the body portion to allow access to contents within the internal reservoir.

15. The bird feeder of claim 14, further comprise a bung or stopper to selectively seal the aperture.

16. The bird feeder of claim 14, further comprising a base member.

17. The bird feeder of claim 16, wherein the base member comprises a footprint that is larger than a footprint of the body portion.

18. The bird feeder of claim 14, wherein the second attachment member for selectively securing the mounting assembly to an object or person comprises a spring clip.

19. The bird feeder of claim 14, wherein the interior reservoir comprises an internal volume of between approximately 2.0 and 10.0 fluid ounces.

20. The bird feeder of claim 14, wherein the mounting assembly comprises a telescoping member with a selectively adjustable length.

* * * * *